(12) United States Patent
Mills

(10) Patent No.: US 10,689,963 B2
(45) Date of Patent: Jun. 23, 2020

(54) AUTOMATED WASH SYSTEMS FOR A PROGRESSING CAVITY PUMP SYSTEM

(71) Applicant: BRISTOL, INC., Watertown, CT (US)

(72) Inventor: Thomas Matthew Mills, Katy, TX (US)

(73) Assignee: BRISTOL, INC., Watertown, CT (US)

( * ) Notice: Subject to any disclaimer, the term of this patent is extended or adjusted under 35 U.S.C. 154(b) by 210 days.

(21) Appl. No.: 15/711,484

(22) Filed: Sep. 21, 2017

(65) Prior Publication Data

US 2018/0087368 A1    Mar. 29, 2018

Related U.S. Application Data

(60) Provisional application No. 62/399,873, filed on Sep. 26, 2016.

(51) Int. Cl.
| | |
|---|---|
| E21B 37/00 | (2006.01) |
| E21B 43/38 | (2006.01) |
| E21B 43/12 | (2006.01) |
| F04B 49/10 | (2006.01) |
| E21B 34/02 | (2006.01) |
| E21B 47/00 | (2012.01) |
| E21B 47/10 | (2012.01) |
| E21B 47/04 | (2012.01) |
| F04B 17/03 | (2006.01) |

(Continued)

(52) U.S. Cl.
CPC .............. *E21B 43/38* (2013.01); *E21B 34/02* (2013.01); *E21B 37/00* (2013.01); *E21B 43/126* (2013.01); *E21B 43/128* (2013.01); *E21B 47/0007* (2013.01); *E21B 47/10* (2013.01); *F04B 49/103* (2013.01); *F04B 49/106* (2013.01); *E21B 47/042* (2013.01); *F04B 17/03* (2013.01); *F04B 47/06* (2013.01); *G01F 22/02* (2013.01)

(58) Field of Classification Search
CPC ........................................................ E21B 37/08
See application file for complete search history.

(56) References Cited

U.S. PATENT DOCUMENTS 2,773,551 A * 12/1956 Warden .................. E21B 41/02
166/310
3,171,485 A *  3/1965 White, Jr. ............... E21B 41/02
166/310

(Continued)

OTHER PUBLICATIONS

International Search Report and Written Opinion, corresponding to International Application No. PCT/US2017/051748, dated Apr. 20, 2018.

(Continued)

*Primary Examiner* — Shane Bomar
*Assistant Examiner* — Steven A MacDonald
(74) *Attorney, Agent, or Firm* — Marshall, Gerstein & Borun LLP

(57) ABSTRACT

An automated wash system for use with a progressing cavity (PC) pump system. The automated wash system includes a wash fluid source and a wash valve. The wash valve is in fluid communication with the wash fluid source and an annulus of a well casing of the PC pump system and is operably coupled to the controller. Upon receipt of a command to initiate a wash cycle, the controller opens the wash valve to enable wash fluid to be directed into the annulus and increases a speed of a PC pump of the PC pump system to effect cleaning of the well casing.

18 Claims, 4 Drawing Sheets

(51) Int. Cl.
*F04B 47/06* (2006.01)
*G01F 22/02* (2006.01)

(56) References Cited

U.S. PATENT DOCUMENTS

| | | | | |
|---|---|---|---|---|
| 3,899,027 A * | 8/1975 | Jenkins | ............... | E21B 37/08 166/249 |
| 4,118,148 A * | 10/1978 | Allen | ............... | E21B 47/0008 417/12 |
| 4,436,148 A * | 3/1984 | Maxwell | ............... | E21B 37/06 137/870 |
| 4,508,488 A * | 4/1985 | Pikna | ............... | F04B 49/02 417/12 |
| RE32,304 E * | 12/1986 | Maxwell | ............... | E21B 37/06 137/870 |
| 4,830,112 A * | 5/1989 | Erickson | ............... | C09K 8/54 166/304 |
| 5,103,914 A * | 4/1992 | LaHaye | ............... | E21B 41/02 166/310 |
| 5,246,074 A * | 9/1993 | Ayres | ............... | E21B 33/068 166/310 |
| 5,343,941 A * | 9/1994 | Raybon | ............... | E21B 37/06 166/53 |
| 5,782,608 A * | 7/1998 | McKee | ............... | E21B 43/126 417/43 |
| 5,996,691 A * | 12/1999 | Norris | ............... | E21B 43/121 166/250.03 |
| 6,464,464 B2 * | 10/2002 | Sabini | ............... | F04D 15/0066 318/432 |
| 7,318,476 B2 * | 1/2008 | Ayres | ............... | E21B 33/068 166/304 |
| 7,870,900 B2 | 1/2011 | Dorado et al. | | |
| 9,441,469 B2 | 9/2016 | Morris et al. | | |
| 10,077,642 B2 * | 9/2018 | Elmer | ............... | E21B 43/122 |
| 2004/0168811 A1 * | 9/2004 | Shaw | ............... | E21B 41/02 166/368 |
| 2004/0206508 A1 * | 10/2004 | Chan | ............... | E21B 33/068 166/312 |
| 2010/0274546 A1 * | 10/2010 | Zafari | ............... | E21B 37/00 703/10 |
| 2015/0322755 A1 * | 11/2015 | Peterson | ............... | E21B 28/00 166/311 |

OTHER PUBLICATIONS

International Search Report and Written Opinion, corresponding to International Application No. PCT/US2017/051743, dated Dec. 6, 2017.

* cited by examiner

AUTOMATED WASH SYSTEMS FOR A PROGRESSING CAVITY PUMP SYSTEM

FIELD OF THE DISCLOSURE

The present invention relates generally to progressing cavity pumps, and more specifically, to an automated wash system and method for use with a progressing cavity pump (PCP) system.

BACKGROUND OF THE DISCLOSURE

Some oil and gas wells produce sand and silt along with produced liquid. Progressing cavity pumps (PCPs) are particularly suited to these applications because they can mobilize such fluid mixtures without sustaining significant damage. Although PCPs can typically move dirty fluid through the pump, the solid material must still be conveyed all the way to the surface, which in some cases is a distance of 1000 meters or more. It has long been understood that the solid particles will be carried to the surface by the liquid as long as the upward velocity of the surrounding liquid exceeds a particular critical velocity. If the liquid velocity falls below the critical velocity, solid particles will begin to accumulate. If enough material settles in the production tubing, a flow restriction is created. This restriction results in increased torque requirement for the pump and can further decrease fluid velocity. If the solid material accumulates at the top of the pump, it can interfere with the rotation of an eccentric rotor pin and sucker rod drive string. The problem can gradually compound, resulting in a situation where the pump can no longer pump fluid to the surface. A well in this final state is commonly termed "sanded up" or "silted up".

Traditionally, oil and gas production operators often allow wells to pump until an unusually high torque load is noted. In some cases, the situation goes unnoticed and the well may "sand up." In either case, an intervention is required. The intervention might involve manually dumping liquid down the casing/tubing annulus and trying to pump at a higher speed in an attempt to create flow in the regime of critical velocity. This procedure sometimes alleviates the problem, but, quite commonly, a more elaborate intervention is needed. The enhanced intervention involves lifting a sucker rod string coupled to the PC pump to disengage the PCP rotor from the stator. Because PC pumps are rarely installed with a standing valve, this opens an unrestricted conduit within the tubing from the surface down to the pump intake. Fluid can then be pumped down the tubing to reverse the flow of remaining solid material down the tubing and out into the casing annulus. The rotor can then be re-seated and pumping resumed.

Such interventions, however, are costly and result in considerable unproductive time for the well. In some cases, the action taken to clear the well conduit can result in sand or silt being pushed into the producing formation, which is an undesirable situation that might detract from the ultimate recovery of the well.

Considerations for Coalbed Methane Wells

Although solids accumulation in the production conduit is an undesirable situation for any oil or gas well, it is especially problematic in coalbed methane wells. In coalbed methane production, the downtime associated with a "sand up" condition is particularly detrimental to production. When the well is placed back in pumping operation it may take days before any gas production resumes. Coalbed methane wells are also more difficult to keep clean because the water produced has a lower viscosity than the oil produced by most oil wells. Because the critical velocity required to carry solids to the surface is inversely proportional to liquid viscosity, significantly higher flow rates need to be maintained in coalbed methane wells to sustain a clean production conduit. The situation for coalbed methane wells is particularly compounded by the fact that water production from these wells declines as the well continues to be pumped. In general, the water production rate from these wells continuously declines while the gas production rate increases. As a result, the producing formation is often providing inadequate quantities of water to sustain critical velocity through the pump and tubing.

One approach to alleviating this problem is to continuously inject supplemental quantities of additional clean liquid at or near the pump intake. With the reservoir liquid volume supplemented by this injected volume, the pump could be run at a higher rate. Using this technique, critical velocity could be continuously maintained within the tubing. For this type of operation, the liquid could simply be dumped down the casing annulus and allowed to fall to the pump intake. Such an approach is sometimes utilized. But, again, coalbed methane wells pose a particular problem for this technique. Since the casing annulus is used as a production conduit for the gas phase, it is difficult to get the injected liquid (water) to fall against the gas flow in the annulus.

In some installations a third conduit (in addition to tubing and casing-tubing annulus) is installed in the well to facilitate continuous liquid injection. Hollow sucker rods are one means of providing an additional conduit, but add significant cost and complexity to the installation.

A modification of the continuous dump procedure involves intermittent introduction of a slug of liquid into the wellbore while simultaneously increasing the pump rate. Such a procedure could be used to wash the accumulated solids from the tubing. In order to inject the slug of liquid, the casing flow valve would need to be temporarily closed to allow the liquid to fall to the bottom of the well. If the procedure is executed at the proper frequency, the tubing could be kept relatively clean of solids accumulation. The procedure could be executed manually using a water tank truck with pump and a human operator to perform all steps in the procedure. Because of the time required to complete the procedure on a single well, it is likely that one operator could only wash four or five wells per day. In a small operation, this manual operating approach might be acceptable.

SUMMARY OF THE DISCLOSURE

In accordance with a first exemplary aspect of the disclosure, an automated wash system for use with a progressing cavity (PC) pump system is disclosed. The PC pump system has a well casing with an annulus, a progressing cavity (PC) pump disposed within the well casing, a motor operatively coupled to the PC pump, a controller operatively coupled to the motor, and a gas flow valve in communication with the annulus and operatively coupled to the controller. The automated wash system comprises a wash fluid source adapted to be operably coupled to the controller and a wash valve in fluid communication with the wash fluid source and the annulus of the well casing. The wash valve is adapted to control the flow of wash fluid between the wash fluid source and the annulus and is operatively coupled to the controller. Upon receipt of a command to initiate a wash cycle, the controller closes the gas flow valve, opens the wash valve to enable wash fluid from the wash fluid source to be directed into the annulus and increases a speed of the PC pump via a signal to the motor to effect cleaning of the well casing.

According to another exemplary aspect of the present disclosure, a progressing cavity (PC) pump system comprises a well casing with an annulus, a progressing cavity (PC) pump disposed within the well casing, and a motor operatively coupled to the PC pump. A controller is operatively coupled to the motor, and a gas flow valve is in communication with the annulus of the well casing and disposed in a fluid flow line. An automated wash system is operatively coupled to the controller and includes a wash fluid source and a wash valve in fluid communication with the wash fluid source and the annulus of the well casing. The wash valve is adapted to control the flow of wash fluid between the wash fluid source and the annulus and operably coupled to the controller. Upon receipt of a command to initiate a wash cycle, the controller closes the gas flow valve to stop an upward flow of fluid in the annulus of the well casing, opens the wash valve to allow fluid from the wash fluid source to be directed into the annulus, and increases a speed of the PC pump via a signal to the motor to effect cleaning of the well casing.

According to a further exemplary aspect of the present disclosure, a method of automatically washing a well casing of a progressing cavity (PC) pump system is disclosed. The method includes initiating, via a controller, a wash cycle of an automated wash system operably coupled to the PC pump system, and disabling, via the controller, a normal speed control of a progressing cavity (PC) pump of the PC pump system. The method further includes closing, via the controller, a gas flow valve to stop upward fluid flow in an annulus of the well casing, and initiating, via the controller, a wash fluid volume calculation process. The method also includes opening, via the controller, a wash valve to allow fluid from the wash fluid source into the annulus of the well casing, and initiating, via the controller, a wash fluid volume recovery calculation process. The method still further includes, upon wash fluid accumulation within the annulus, increasing the speed of the pump to begin flushing the well casing. In addition, the method includes maintaining the increased speed of the pump until one or more of a preset wash time expires or an estimated wash volume has been exceeded, and closing the wash valve to complete washing of the well casing. Lastly, the method includes reopening, via the controller, the gas flow valve and resuming the normal speed control of the PC pump.

In yet another exemplary aspect of the present disclosure, a method of estimating an amount of wash fluid injected into a well casing of a progressing cavity (PC) pump system to effect washing of the well casing is disclosed. The method comprises initializing, via a controller of the PC pump system, a wash volume to zero in response to closing of a gas flow valve to initiate wash cycle, and determining, via the controller, one of: (1) a flow rate of the wash fluid by one of a wash flow meter or a user-entered flow rate; or (2) an initial wash fluid volume in the wash fluid source by a level sensor of the wash fluid source. The method further includes, upon expiration of a preset calculation period, calculating, via the controller, one of: (1) an incremental wash fluid volume and adding the incremental wash fluid volume to an accumulated volume; or (2) a current wash fluid volume in the wash fluid source based on a level of fluid sensed by the level sensor and subtracting, via the controller, the current wash fluid volume from the initial wash fluid volume in the wash fluid source.

In another exemplary aspect of the present disclosure, a method of automatically measuring an amount of wash fluid volume recovered from a well casing of a progressing cavity (PC) pump system during washing of the well casing is also disclosed. The method comprises initializing, via a controller of the PC pump system, a recovered wash fluid volume value to zero upon opening a wash valve of the automated wash system to allow wash fluid from the wash fluid source into an annulus of the well casing, and determining, via the controller, a baseline flow rate via a flow line meter. The method further includes, upon expiration of a preset period of time, measuring, via the controller, a current flow rate of the fluid being pumped from the well casing, the current flow rate equal to a surface flow line rate. The method also includes calculating, via the controller, an incremental wash fluid volume recovered, and determining, via the controller, a new wash fluid volume recovered.

In accordance with yet another exemplary aspect of the present disclosure, another method of automatically washing a well casing of a progressing cavity (PC) pump system is disclosed. The method comprises disabling, via the controller, a normal speed control of a progressing cavity (PC) pump of the PC pump system, and then closing, via the controller, a gas flow valve to stop upward fluid flow in an annulus of the well casing. The method also includes initiating, via the controller, a wash fluid volume calculation process, and opening, via the controller, a wash valve to allow fluid from the wash fluid source into the well casing. The method still further includes, upon wash fluid accumulation within the annulus, increasing the speed of the pump, via the controller, to begin flushing the well casing, and closing, via the controller, the wash valve.

In further accordance with any one or more of the exemplary aspects, the automated wash system, the PC pump system, or any method of the present disclosure may include any one or more of the following further preferred forms.

In some preferred forms, the system may further comprise a pump for pressuring wash fluid in the wash fluid source. The pump may be disposed downstream the wash fluid source and operatively coupled to the controller, such that the pump is controlled by the controller via a signal. In addition, the system may further include a flow meter disposed downstream the wash fluid source that is adapted measure the quantity of wash fluid being injected into the annulus of the well casing. The flow meter may be in communication with the controller to provide a signal indicative of the measured quantity of the wash fluid being injected to the controller. Further, the system may include a speed varying device coupled to the motor and adapted to control the motor via one or more of an electrical cable or a hydraulic line. Still further, the speed varying device may be operatively coupled to the controller, and the controller may manage the speed of the speed varying device via a signal. Moreover, the system may include a level sensor disposed in the wash fluid source.

In some other preferred forms, the PC pump may be in fluid communication with the fluid flow line, and the PC pump system may further include a casing valve in the fluid flow line. In addition, the system may include tubing coupled to the PC pump and disposed within the annulus, and a flow tee, such that fluid from the PC pump travels through the tubing and out of the flow tee. The system may further include a tubing flow meter disposed downstream the flow tee, the tubing flow meter to measure fluid leaving the flow tee and traveling through the flow line.

In still some other preferred forms, the method may include wherein initiating a wash cycle is in response to one or more of: (1) a predetermined time is met; (2) a torque of the pump exceeds a predetermined high torque limit; or (3) a manual input to a workstation in communication with the controller. The method may also include capturing a motor speed setting for normal speed control, via the controller, to enable the controller to reset the speed of the motor to the captured motor speed setting for normal speed control upon completion of the wash cycle. Further, the method may include determining whether a fluid settling time has expired, and, upon expiration of a fluid settling time, initiating the wash volume calculation process.

In other preferred forms, the wash fluid volume calculation process or method may include: (1) initializing a wash volume to zero; (2) determining one of: (a) a flow rate of the wash fluid by one of a wash flow meter or a user-entered flow rate; or (b) an initial wash fluid volume in the wash fluid source by a level sensor; and (3) upon expiration of the calculation period time, calculating one of: (a) an incremental wash fluid volume and adding the incremental wash fluid volume to an accumulated volume to obtain an estimated amount of wash fluid volume injected into the annulus of the well casing; or (b) a current wash fluid volume based on a level of fluid sensed by the level sensor and subtracting the current wash fluid volume from the initial wash fluid volume in the wash fluid source.

In still other preferred forms, opening, via the controller, the wash valve to allow fluid from the wash fluid source into the annulus of the well casing may include one of allowing time for the wash valve to complete a stroke cycle and starting a pump disposed downstream the wash fluid source to begin wash fluid flow into the annulus of the well casing. In addition, the wash fluid volume recovery calculation process may comprise: (1) initializing a recovered wash fluid volume value to zero; (2) determining a baseline flow rate via a flow line meter; (3) determining if a calculation period time has expired; (4) upon expiration of the calculation period time, measuring a current flow rate of the fluid being pumped from the well casing, the current flow rate equal to a surface flow line rate; (5) calculating an incremental wash fluid volume recovered that includes subtracting the baseline flow rate from the current flow rate; and (6) determining a new wash fluid volume recovered by adding the calculated incremental wash fluid volume recovered to the previously calculated wash fluid volume recovered until termination by the controller.

In addition, the method may include initiating a liquid fall time upon initiating the wash fluid volume recovery calculation and determining the liquid fall time has expired to account for a time lag between a beginning of the injection of wash fluid and when the wash fluid accumulates in a downhole of the well casing. Further, the method may include terminating, via the controller, the wash volume calculation after the wash valve is closed. Still further, the method may include reopening, via the controller, the gas flow valve to resume normal flow of fluid, such as gas, which occurs upon determining a liquid fall time has expired. The method may also include maintaining an increased pump speed until either a post-wash pumping time has expired or the wash fluid volume recovery calculation exceeds an estimated wash fluid volume injected and then terminating the wash fluid volume recovery calculation process. Lastly, the method may include, upon termination of the wash fluid volume recovery calculation process, returning, via the controller, the PC pump to a normal speed control.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DETAILED DESCRIPTION OF THE DISCLOSURE

Generally, an automated wash system for use with a progressing cavity (PC) pump system is disclosed. The automated wash system includes a wash fluid source that is communicably and operatively coupled to a controller of the PC pump system, such that the wash fluid source is responsive to signals and/or commands from the controller. The automated wash system further includes a wash valve in fluid communication with the wash fluid source and an annulus of a well casing of the PC pump system. The wash valve controls the flow of wash fluid between the wash fluid source and the annulus. So configured, upon receipt of a command to initiate a wash cycle, the controller estimates an amount of wash fluid from the wash fluid source that has been injected into the annulus. The controller then automatically opens the wash valve to enable a preset amount of wash fluid from the wash fluid source to be directed into the annulus, and increases a speed of the PC pump via a signal to a motor operatively coupled to the PC pump to effect cleaning of the well casing.

Figure 1:
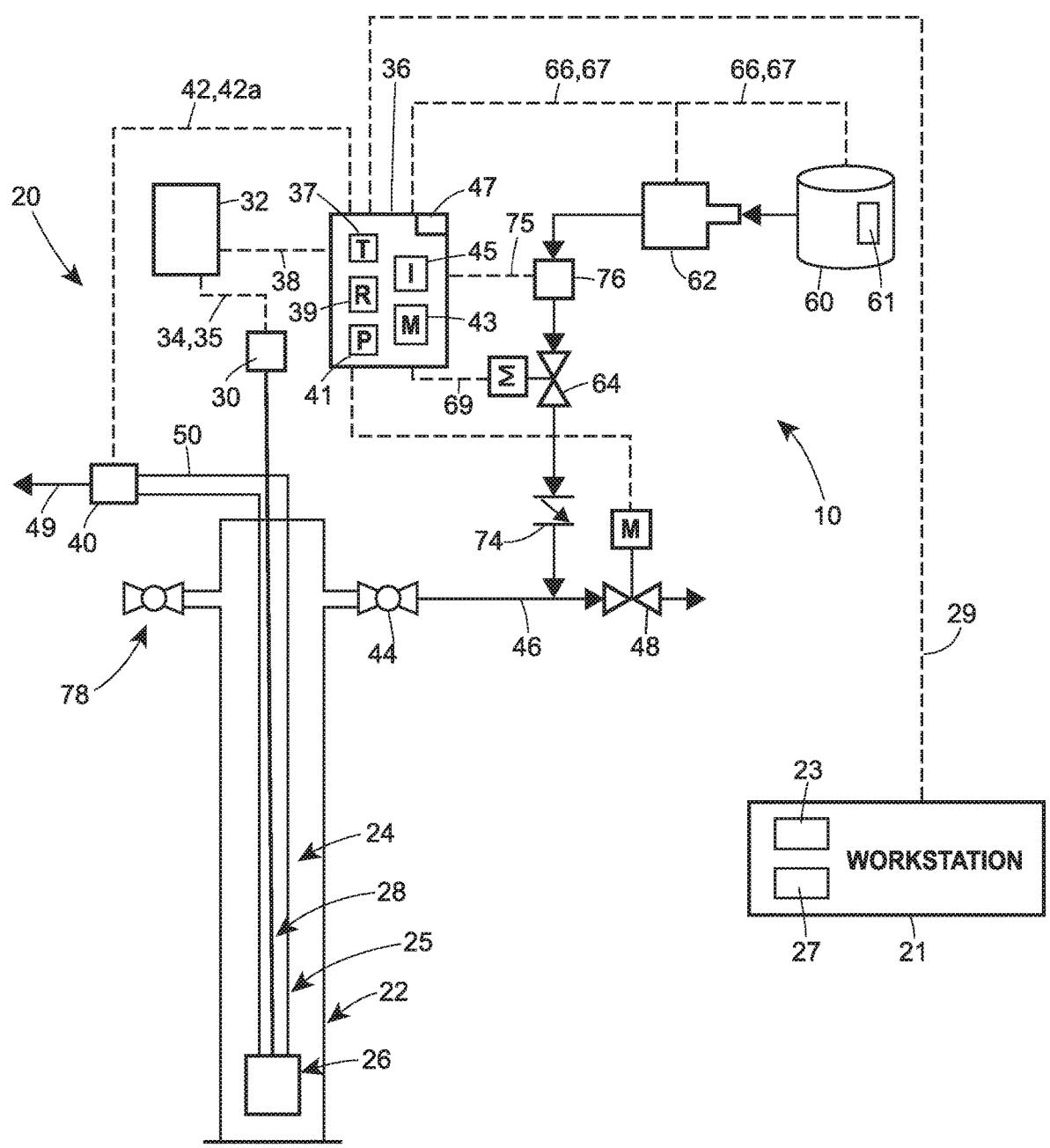
FIG. 1 is a schematic view of an automated wash system for use with a progressing cavity pump system in accordance with one aspect of the present disclosure.

Referring now to FIG. 1, an automated wash system 10 for use with a progressing cavity (PC) pump system 20 is depicted. The PC pump system 20 includes a well casing 22 with an annulus 24 and a processing cavity (PC) pump 26 disposed within the annulus 24 of the well casing 22. In this example, the PC pump 26 is installed on an end of tubing 25 also disposed within the annulus 24 of the well casing. A sucker rod string 28 connects the PC pump 26 to a motor 30 disposed at a surface above the PC pump 26, for example, which may be referred to as a top drive system. As one of ordinary skill in the art will appreciate, the motor 30 may alternatively be installed downhole, such as below a surface above the PC pump 24 or within the annulus of 24 of the well casing 22, as in an Electrical Submersible Processing Cavity Pump (ESPSP), and still fall within the scope of the present disclosure.

The motor 30 is controlled by a speed varying device 32. The speed varying device 32 may be one of a variable speed electric drive or a hydraulic pump with speed adjustment capability. The speed varying device 32 is operatively and communicably coupled to the motor 30 via an electrical cable 34 or one or more hydraulic lines 35.

The PC pump system 20 further includes a controller 36. As depicted in FIG. 1, the controller 36 is communicably coupled to the speed varying device 32 via one or more of an electrical cable 38 or a wireless network. The controller 36 may send a command to the speed varying device 32, for example, via a signal to operate and/or control the speed of the motor 30 and, thus, the PC pump 26. In one example, the controller 36 includes a transmitter 37, a receiver 39, a processor 41, a memory 43, an input 45, and a network interface 47, as described more below.

In some examples, a flow line meter 40 is installed in the PC pump system 20 and the controller 36 is operatively and communicably coupled to the flow line meter 40 via one of at least one electrical cable or a wireless network 42. As a result, an output of the flow line meter 40, for example, may be transmitted to the controller 36 via a flow line meter signal 42a.

The PC pump system 20 may still further include a casing valve 44 that is connected to the annulus 24 of the well casing 22 and is disposed within a fluid flow line 46, such as a gas flow line. In addition, a gas flow valve 48 is also disposed within the fluid flow line 46 downstream the casing valve 44. Further, another casing valve 78 may be connected to the annulus 24 of the well casing 22 on a side opposite the other casing valve 44, as further depicted in FIG. 1. The casing valve 78 may also be disposed within the fluid flow line 46. In other examples, the casing valve 78 may not be connected to any fluid flow line.

Under normal operating conditions, a produced fluid, such as gas, separates from a liquid downhole in the annulus 24 of the well casing 22 and flows up the annulus 24, through the casing valve 44 and the gas flow valve 48, and out to the gas flow line 46. Fluid also produced through the PC pump 26 travels or flows up the tubing 25 and out a flow tee 50. In some cases, and as noted, the flow meter 40 is installed downstream the flow tee 50, as depicted in FIG. 1, and measures fluid leaving the flow tee 50 and traveling through a fluid flow line 49.

Still referring to FIG. 1, and as noted, the PC pump system 20 is operatively coupled to the automated wash system 10. More specifically, the automated wash system 10 includes a wash fluid source 60 that is communicably coupled to the controller 36 of the PC pump system 20. The wash fluid source 60 supplies liquid, such as wash fluid, that is used for the washing process, as described more below, and may include multiple fluid sources. In one example, the wash fluid source 60 is a reservoir of clean liquid. In another example, the wash fluid source 60 is a tank.

Depending upon the fluid source and the pressure of the flowing gas or fluid, for example, a pump 62 might be included, and in some cases, required, to pressurize the liquid from the wash fluid source 60. As depicted in FIG. 1, the pump 62 is disposed downstream the wash fluid source 60 and is also communicably coupled to the controller 36 of the PC pump system 20 via an electrical cable 66, for example. As such, the controller 36 is able to control the state of the pump 62 via a signal 67, for example, that travels along the electrical cable 66 between the controller 36 and the pump 62.

If the pump 62 is not included, the controller 36 may be directly coupled to the wash fluid source 60 by the electrical cable 66, for example. In that case, the controller 36 calculates an amount of wash fluid using a level gauge or a level sensor 61 disposed in a wash fluid vessel or a tank of the wash fluid source 60. More specifically, the controller 36 can relate the change in liquid level within the wash fluid vessel or tank of the wash fluid source 60 using the level sensor 61, for example, to estimate the wash fluid volume, as explained more below relative to FIG. 3.

The automated wash system 10 also includes a wash valve 64 in fluid communication with and disposed downstream the wash fluid source 60. The wash valve 64 may also be in fluid communication with the casing valve 44 in the fluid flow line 46, such as the gas flow line, and the annulus 24 of the well casing 22 of the PC pump system 20. Alternatively, the wash valve 64 may be in fluid communication with an alternative casing valve 78 and the annulus 24 of the well casing 22 of the PC pump system 20. So configured, the wash valve 64 controls the flow of liquid, such as the wash fluid between the wash fluid source 60 and the annulus 24. In addition, and as also depicted in FIG. 1, the wash valve 64 is also operatively coupled to the controller 36 of the PC pump system 20 via one or more of an electrical cable 69 or wireless network, for example. Thus, the controller 36 also controls the operation of the wash valve 64 via one or more signals via the electrical cable or wireless network, for example.

In one example, upon receipt of a command to initiate a wash cycle of the automated wash system 10, the controller 36 of the PC pump system 20 closes the gas flow valve 48 to stop an upward flow of fluid in the annulus 24 of the well casing 22 during normal operation of the PC pump system 20. The controller 36 then automatically estimates an amount of wash fluid from the wash fluid source 60 that has been injected into the annulus 24 of the well casing 22. Next, the controller 36 automatically opens the wash valve 64 via the signal 69 to enable fluid, such as wash fluid, from the wash fluid source 60 to be directed to and flow to the annulus 24. In addition, the controller 36 also automatically increases the speed of the PC pump 26 via a signal 38 to the motor 30 by way of the speed varying device 32 coupled to the motor 30 to effect cleaning one or more of the well casing 22, the pump 26 and tubing 25, as explained more below.

In some examples, and as depicted in FIG. 1, a check valve 74 is disposed downstream the wash valve 64 and prevents any fluid from flowing toward the wash valve 64 during normal operation of the PC pump system 20. In addition, and in other examples, a flow meter 76 is optionally disposed downstream the wash fluid source 60 and measures a quantity of wash fluid being injected into the annulus 24 of the well casing 22. Like the other components of the automated wash system 10, the flow meter 76 is also operatively and communicably coupled to the controller 36 of the PC pump system 20 via one or more of an electrical cable 75 or a wireless network. In one example, flow meter 76 provides a signal to the controller 36, the signal indicative of a measured quantity of the wash fluid being injected into the controller 36.

As also depicted in FIG. 1, a workstation 21 may be communicably coupled to the controller 36 via one or more of a wireless connection or an electrical connection, for example. In one example, the workstation 21 includes a transmitter 23 to transmit one or more signals 29 to the receiver 39 of the controller 36 to begin the wash cycle. The workstation 21 may also include a memory 27.

Figure 2:
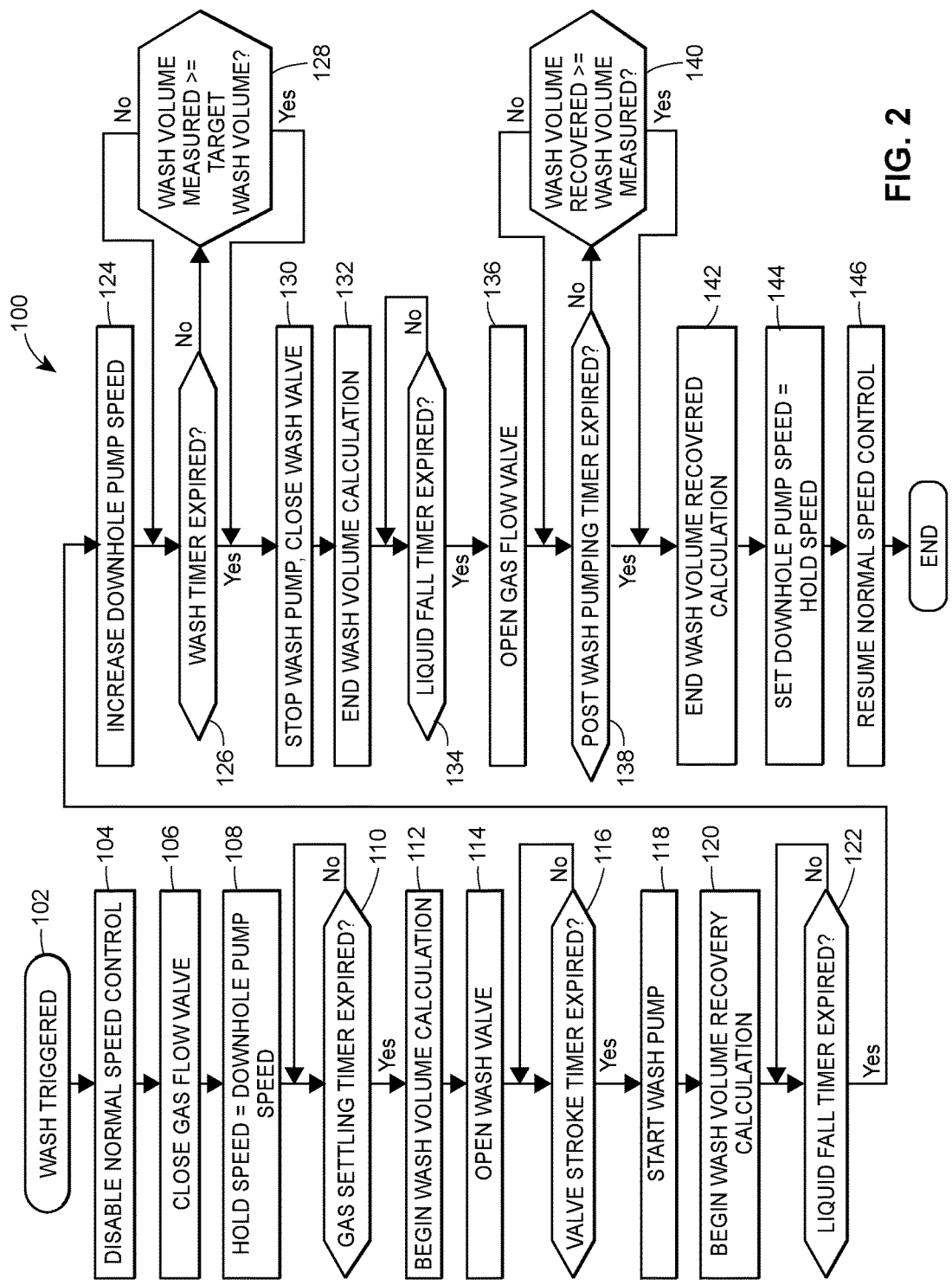
FIG. 2 is a block diagram depicting an automated wash method for use with the progressing cavity pump system depicted in FIG. 2.

Referring now to FIG. 2, a flow chart depicting a method 100 of automatically washing the well casing 22 of the PC pump system 20 is provided. More specifically, at block 102, a wash cycle is triggered, resulting in the controller 36 receiving a command, such as a signal, to initiate a wash cycle of the automated wash system 10. In one example, the controller 36 continuously monitors a torque on the motor 30. This torque is typically inferred (e.g., not measured directly), by the speed varying device 32. As such, the controller 36 is continuously monitoring the torque via signal 38. When the torque value received by the controller 36 exceeds a preset, such as human entered set point or target value, the controller 36 determines that it is time to trigger the wash cycle.

In yet another example, the wash cycle is manually triggered, such as manually inputted on the workstation 21 (FIG. 1) communicably coupled to the controller 36. Thus, upon manual input on the workstation 21 to begin the wash cycle of the automated wash system 10, a transmitter 23 of the workstation 21 transmits a signal to the receiver 39 of the controller 36 to begin the wash cycle. In another example, the wash cycle may be manually triggered by an operator providing an input to a local human-machine-interface (HMI), such as a keypad/display, or graphical touchscreen device or other similar device that is communicating with the controller 36. In yet another example, the wash cycle may be triggered via a different controller, such as a programmable logic controller (PLC), which may be supervising the operation of controller 36 of the PC pump system 20. In addition, the wash cycle may be trigged by a momentary contact switch an operator presses. One of ordinary skill in the art will appreciate that still additional, various other methods of manually triggering the wash cycle may be implemented and still fall within the scope of the present disclosure.

At block 104, and in response to initiation of the wash cycle of the automated wash system 10, the controller 36 automatically disables the normal speed control of the PC pump system 20. Next, at block 106, the gas flow valve 48 is closed to stop upward flow in the annulus 24, for example.

At block 108, the controller 36 captures, e.g., one or more of detects and saves, a current speed setting of the motor 30 so that the controller 36 can reset a speed command at the end of the wash cycle to the captured speed setting of the motor 30, for example. In one example, a speed of a downhole area of the PC pump 26 equals a hold speed of the speed setting of the motor 30. The controller 36 then captures and saves this hold speed to the memory 43 of the controller 36 for use at a later time.

Next, at block 110, the controller then waits for a predetermined period of time to allow fluid, such as gas, flow to settle. Said another way, the controller 36 waits for a period of time to allow fluid flow in the annulus 24 of the well casing 22 to settle after closing the casing valve 44. In one example, a gas setting time is set for a period of time and controller 36 waits until this period of time has expired after closing the gas flow valve 48. The period of time may be 10 seconds or a period of time greater or less than 10 seconds and still fall within the scope of the present disclosure.

At block 112, the controller 36 of the PC pump system 20 automatically initiates a wash volume calculation process 200, which includes estimating an amount of wash fluid which has been injected into the annulus 24 of the well casing 22, as explained more below relative to FIG. 3.

Next at block 114, the controller 36 automatically opens the wash valve 64, allowing fluid to flow from the wash fluid source 60 into the annulus 24 of the well casing 22. In some cases the wash fluid needs to be pressurized, and there are several methods of pressurizing the wash fluid from the wash fluid source 60 including using a pump. In some examples, the fluid from the wash fluid source 60 may be pumped and recycled liquid or fluid, which has been processed through some sort of separation facility to remove solid material. In another example, and more generally, the controller 36 needs to allow time for the wash valve 64 to complete its stroke cycle and then starts a surface pump, such as pump 62, to begin liquid flow into the annulus 24. More specifically, and in one example, at block 116 the controller 36 determines if a preset time of a valve stroke time has expired. If no, the controller 36 continues to wait until the preset time is met. If yes, the controller 36 starts the wash pump 62, if the wash pump 62 is being used.

At block 120, the controller automatically initiates a wash fluid volume recovery calculation process 300, which includes measuring an amount of wash fluid volume recovered, as explained more below relative to FIG. 4. Upon initiation of the wash fluid volume recovery calculation process 300, the controller 36 determines if a preset period of time of a liquid fall time has expired in block 122 to account for a time lag between the beginning of an injection and when the liquid, such as the wash fluid, begins to accumulate downhole. This time lag is dependent upon certain characteristics of the wall casing 22, such as wellbore deviation, measured depth, and vertical depth of a pump intake, for example. In one example, a value of sixty seconds is typically sufficient for a vertical well with a depth of approximately 1000 meters. Of course, one of ordinary skill in the art will understand that times greater or less than sixty seconds may also be set and still fall within the scope of the present disclosure. For example, more time is required for deeper wells and more deviated wells. In addition, older wells typically have rougher casings due to corrosion, so the value is then increased. When in doubt, the time period should be overestimated for the preset time of the liquid fall timer in block 122 to prevent running the pump 26 dry, for example.

After the preset time has expired in block 122, and upon wash fluid accumulation in the downhole of the annulus 24, the controller 36 automatically increases the speed of the pump 26 of the PC pump system 20 at block 124. Said another way, the controller 36 increases the downhole speed of the pump 26 to begin flushing the well casing 22, the pump 26, and the tubing 25. The elevated pump speed is maintained until either a preset wash time has expired or the calculated/estimated wash fluid volume has reached a predetermined target wash volume.

More specifically, at block 126 the controller 36 first determines if the preset wash time has expired. If no, the controller 36 then determines if the wash fluid volume measured or estimated is greater than a preset target wash volume at block 128. If no, the controller 36 maintains the increased speed and will again determine if the preset wash time has expired in block 126, for example, until either the time has expired or the wash volume measured exceeds the target wash volume in block 128.

At block 130, after one of the targets in block 126 or block 128 (time or volume) has been exceeded, the controller 36 then stops the pump 62 of the automated wash system 10 (if the pump 62 is included) and closes the wash valve 64. With no more wash fluid flowing into the well casing 22, at block 132 the controller 36 then terminates the wash fluid volume calculation.

At block 134, the controller 36 determines if a preset time on a liquid fall time has expired to allow the final portion of wash fluid liquid to reach a bottom area of the well casing 22. After the time has expired, the controller 36 opens the gas flow valve 48.

Upon reopening the gas flow valve 48, the elevated pump speed is maintained for an additional period of time until either a preset post-wash pumping time has expired in block 138 or the wash fluid volume recovery calculation reaches a value exceeding the estimated wash fluid volume injected in block 140. Said another way, the controller 36 first determines if a preset post-wash pumping time has expired in block 138. If no, the controller 36 then determines if the wash fluid volume recovery calculation has reached a value exceeding the estimated wash fluid volume injected in block 140. If no, the controller 36 continues to maintain an elevated speed of the pump 26 until one of the conditions in block 138 or block 140 is met.

When either of the two conditions in block 138 or block 140 is met, the controller 36 terminates or ends the wash fluid volume recovery calculation process 300 at block 142. At block 144, the controller 36 then resets the control speed of the motor 30 to the hold speed of the motor 30 captured at the beginning of the wash cycle of the PC pump system 20.

In block 146, the controller 36 is then returned to its normal speed control processes and the wash cycle process awaits the next activation trigger.

Figure 3:
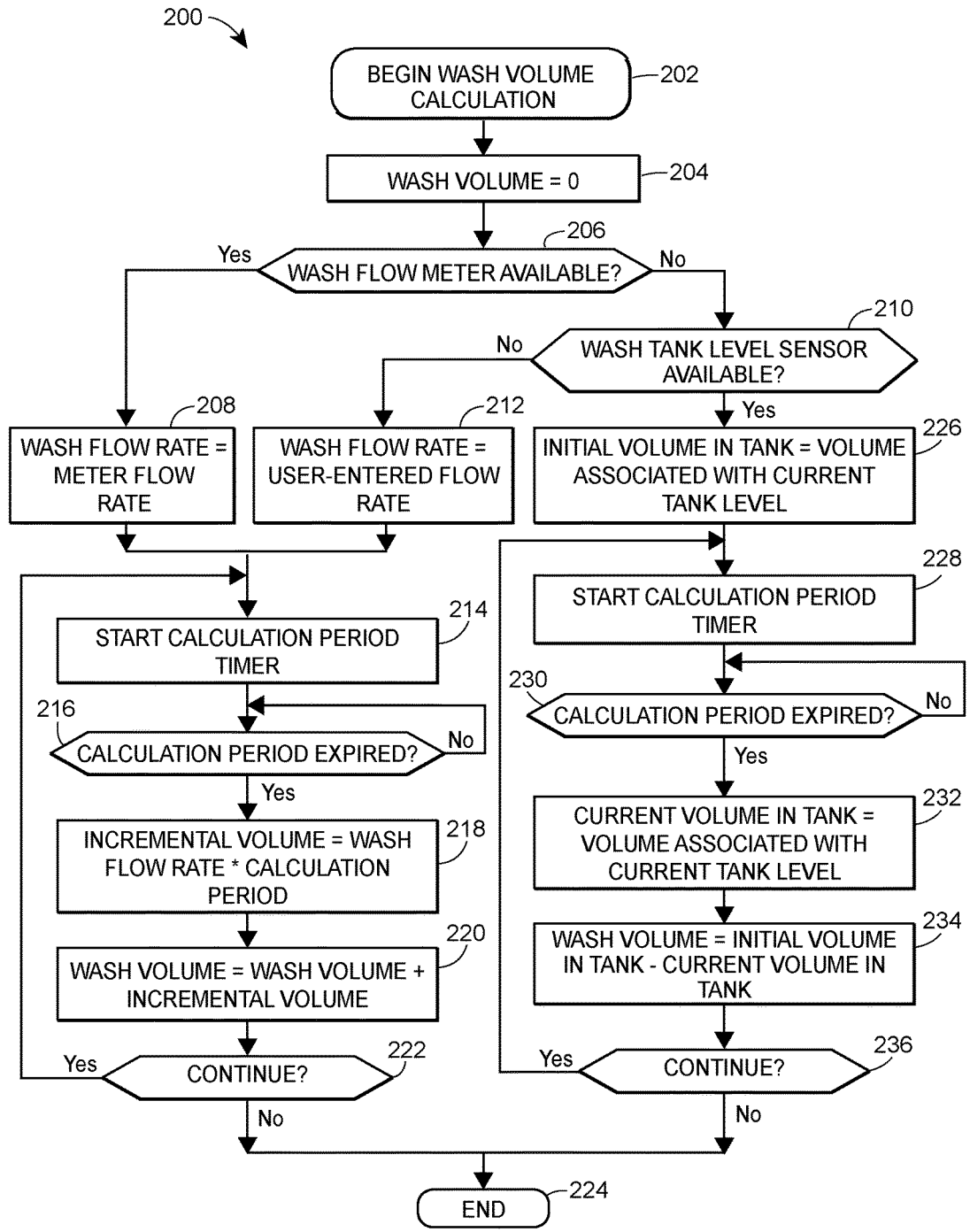
FIG. 3 is a block diagram depicting a wash volume calculation method of the automated wash method of FIG. 2.

Referring now to FIG. 3, a flow chart depicting the wash volume calculation method 200 is depicted. The method 200 includes a method of estimating an amount of wash fluid that has been injected into the annulus 24 of the PC pump system 20 to effect washing of the well casing 22, the pump 26, and the tubing 25. The wash fluid is from the wash fluid source 60 of the automated wash system 10 coupled to the PC pump system 20, as described above.

More specifically, at block 202, the wash fluid volume calculation method 200 begins via the controller 36, for example. Upon receiving a command to begin the wash fluid volume calculation method 200, the controller 36 initializes the wash fluid volume to zero at block 204.

At block 206, it is determined if a wash flow meter is available. Said another way, in one example, the controller 36 determines whether a wash flow meter, such as the flow meter 76, is available. If a flow meter is available, as in the example depicted in FIG. 1 in which the flow meter 76 is disposed downstream the wash fluid source 60 and is operatively coupled to the controller 36, the wash fluid flow rate is captured by the controller 36 as the current flow meter rate at block 208. Said another way, the controller 36 captures the flow rate of the flow meter 76 and uses this value as the wash fluid flow rate. If a flow meter 76 is not available, it is first determined if a level sensor 61 (FIG. 1) of the tank of the wash fluid source 60 is available in block 210. More specifically, if the flow meter is not available, and the wash fluid source 60 includes a tank whose contained liquid volume can be correlated to the liquid level in the tank, the level sensor 61 (FIG. 1) may be used to estimate the amount of wash fluid injected into the annulus 24, as explained more below. If, however, the controller 36 determines there is no level sensor 61, a user-entered flow rate, for example, may be used by the controller 36 as the wash fluid flow rate at block 212. In one example, if the pump 62 used to pressurize the wash fluid from the wash fluid source 60 is of the positive displacement type, the flow rate of the pump 62 can be estimated from manufacturer's information, for example, and provided to the controller 36 via the workstation 21, for example.

If the flow rate is measured 208 or estimated 212, the controller 36 then starts a calculation period timer 214 and determines whether a preset calculation period has expired at block 216. In one example, a calculation period time includes a preset period of time in the range of 1 second to 20 seconds. For example, if the flow meter 76 is included, setting this value to 1 second might provide a higher accuracy of calculated wash fluid volume. In another example, if the flow rate is estimated, e.g., there is no flow meter 76 and no level sensor 61, there is no reason to set the calculation period time to a small value, as the resulting calculated wash fluid volume accumulation will be the same for all calculation periods. In any case, one of ordinary skill in the art will understand that the preset calculation period may be outside of the range of 1 second to 20 seconds, such as greater than 20 seconds, for example, and still fall within the scope of the present disclosure.

After the preset period of time of the calculation period time expires, the controller 36 calculates an incremental wash fluid volume at block 218. More specifically, the flow rate value is mathematically integrated to obtain a new incremental wash fluid volume injected. In one example, the incremental wash fluid volume is calculated according to the following equation:

$$\text{incremental wash fluid volume} = \text{wash fluid flow rate} * \text{calculation period}.$$

In block 220, the incremental wash fluid volume is then added to the previous accumulated wash fluid volume to obtain a new estimate of the injected wash fluid volume. Said another way, the wash fluid volume is calculated according to the following equation:

$$\text{wash volume} = \text{wash fluid volume} + \text{incremental wash fluid volume}.$$

In block 222, the controller 36 then automatically determines whether the calculation method 200 should continue based on whether any termination signal has been received, for example. If no termination signal has been received, the method 200 continues. If a termination signal has been received by the controller 36, for example, the method 200 then ends at block 224.

Alternatively, and referring back to block 210, if no wash fluid meter 76 is available but the level sensor 61 (FIG. 1) is available for measuring liquid level within, for example, the wash fluid source 60, such as a tank, the calculation method 200 records the initial level in the tank and correlates that level to an initial tank volume in block 226. One of ordinary skill in the art will understand that the correlation between liquid level and tank volume can be performed by different methods. Among these methods are simple algebraic equations which assume that the tank has a standard (for example cylindrical) shape. Other methods include strapping tables which provide a reference table to obtain contained liquid volume versus tank level.

At block 228, the controller 36 then starts a calculation period timer 228 and determines whether a preset calculation period has expired at block 230. In one example, a calculation period time includes a preset period of time in the range of 20 seconds. One of ordinary skill in the art will understand that the preset calculation period may be greater than or less than 20 seconds, for example, and still fall within the scope of the present disclosure.

After the preset period of time of the calculation period time expires, the controller 36 calculates a current tank volume at block 232. More specifically, the current tank level is correlated to a contained liquid volume. In block 234, the current liquid volume is then subtracted from the previous accumulated wash fluid volume to obtain a new estimate of the injected wash fluid volume. Said another way, the wash fluid volume is calculated according to the following equation:

wash volume=Initial volume in the tank−current wash fluid volume

In block 236, the controller 36 then automatically determines whether the calculation method 200 should continue based on whether any termination signal has been received, for example. If no termination signal has been received, the method 200 continues. If a termination signal has been received by the controller 36, for example, the method 200 then ends at block 224.

Figure 4:
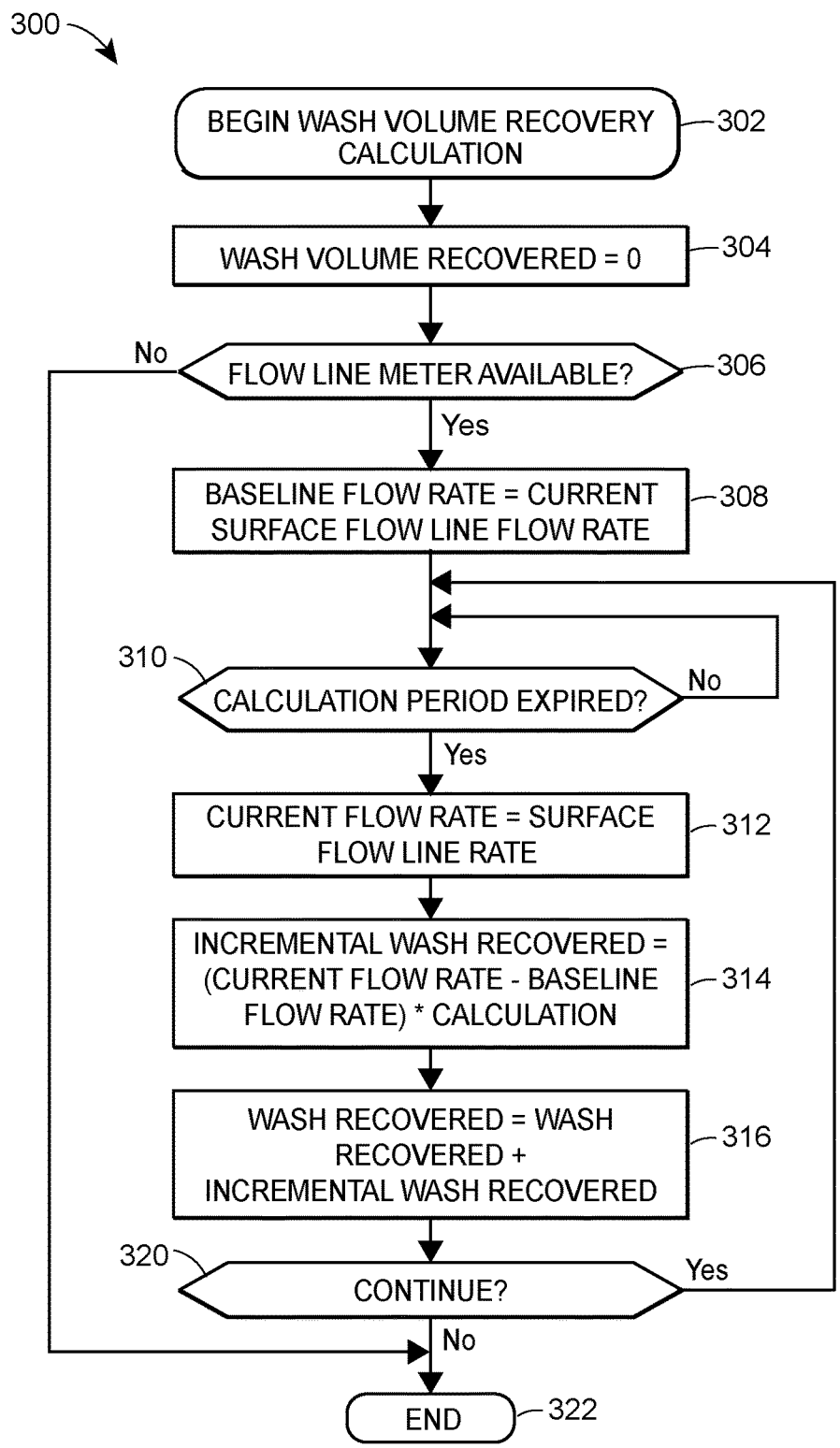
FIG. 4 is a block diagram depicting a wash volume recovery calculation method of the automated wash method of FIG. 2.

Referring now to FIG. 4, a flow chart depicting the wash fluid volume recovery calculation method 300 is depicted. The method 300 includes a method of automatically measuring an amount of wash fluid volume recovered from the well casing 22 of the PC pump system 20 during washing of the well casing 22. At block 302, the method 300 is initiated by the controller 36 of the PC pump system 20 upon opening the wash valve 64 (FIG. 1) to allow wash fluid to be injected into the annulus 24 of the well casing 22.

At block 304, the recovered wash fluid volume is initialized to a value of zero. Next, the controller 36 determines a baseline flow rate via a flow line meter, such as flow meter 76. More specifically, at block 306, the controller 36 first determines if a flow line meter is available. If no flow line meter is available, the method 300 terminates at block 322 with an accumulated wash fluid volume of zero. If, however, a flow line meter is available, the controller 36 captures a baseline flow rate from the flow meter 40 to establish the baseline amount of liquid being pumped from the well. This baseline amount is being provided by the producing oil/gas reservoir that is downhole the well casing 22. When the motor/pump speed is changed, liquid is recovered at a higher rate than before the change. It is desired to continue to pump the baseline amount of liquid (supplied by the producing formation) plus the amount of wash fluid being dumped into the well casing 22.

At block 310, it is determined, by the controller 36, for example, if a second preset calculation period of time has expired. In one example, the second preset calculation period of time is five seconds, but one of ordinary skill in the art will appreciate that the value may be less than or greater than five seconds and still fall within the scope of the present disclosure.

At block 312, and upon expiration of this preset period of time, e.g., the second preset calculation period of time, a current flow rate of fluid or liquid being pumped from the well is measured using the signal 42a from the flow meter 40, such as by the controller 36, for example. The measured current flow rate is then equal to a surface flow line rate.

At block 314, the measured current flow rate is then used to calculate an incremental wash fluid volume recovered. To calculate the incremental wash fluid volume recovered, the baseline flow rate is subtracted from the current flow rate and then multiplied by the calculation time. Said another way, the incremental recovered wash fluid volume is calculated according to the following equation:

Incremental wash fluid volume=(current flow rate−baseline flow rate)*calculation period At block 316, a new wash fluid volume recovered is determined, such as by the controller 36, for example, by adding the incremental wash fluid volume recovered to the previously calculated wash fluid volume recovered until termination by the controller 36 of the PC pump system 20. More specifically, the new wash fluid volume recovered is calculated according to the following equation:

New wash fluid volume recovered=previous wash fluid volume recovered+incremental wash fluid volume recovered At block 320, the controller 36 determines whether the wash fluid volume recovery method 300 should continue based on whether any termination signal has been received, for example. If no termination signal has been received, the process 300 continues. If a termination signal has been received by the controller 36, for example, the process 300 then ends at block 322.

As one of ordinary skill in the art will appreciate, the new automated wash system 10 and method 100, for example, include several advantages. For example, no manual intervention is needed for the PC pump system 20 to clean the well casing 22, the annulus 24, the pump 26 and/or the tubing 25. As a result, unproductive time in stopping and manually cleaning the well casing 22 of the PC pump system 20 is eliminated and the PC pump system 20 operates more efficiently. Moreover, the costs associated with manual cleaning of the PC pump system 20 are also eliminated due to the automated wash system 10 and method 100.

For coalbed methane wells, the difficulty in getting the injected liquid, such as water, to fall against the gas flow in an annulus of the well is significantly reduced, if not eliminated, with the features of the new automated wash system and method described above. In addition, the installation of a third conduit to facilitate continuous liquid injection for coalbed methane wells is also eliminated, reducing the cost and complexity of the overall system and increasing the efficiency of the method of cleaning the well casing, for example.

Still further, while manual intermittent injection of liquid into a well bore while simultaneously increasing a rate of a pump in PC pump systems has been attempted, a water tank truck and human operator are typically required to effectuate such manual procedures, significantly increasing the time to clean a single well and limiting this manual operation to small operation of wells. In contrast, the new automated wash system 10 and method 100 eliminates the use of a water tank truck and human operator, decreasing the time to clean the well casing. In addition, the new automated wash system 10 and method 100 (unlike current manual methods) may effectively be used on large scale PC pump systems, such as PC pump systems having more than five PC pumps and associated well casings.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. An automated wash system, comprising:
   a wash fluid source communicatively coupled to a controller of a progressing cavity (PC) pump system;
   a wash valve in fluid communication with the wash fluid source and an annulus of a well casing of the PC pump system, the wash valve configured to control the flow of wash fluid between the wash fluid source and the annulus, and the wash valve operatively coupled to the controller of the PC pump system; and
   a progressing cavity (PC) pump disposed within the well casing;
   a level sensor disposed in the wash fluid source communicatively coupled to the controller, the controller configured to calculate from the level sensor a wash fluid volume injected into the annulus;
   wherein, upon receipt of a command to initiate a wash cycle, the controller closes a gas flow valve of the PC pump system, opens the wash valve to enable wash fluid from the wash fluid source to be directed into the annulus, and increases a speed of a the PC pimp until the calculated wash fluid volume has reached a predetermined target wash volume.

2. The system of claim 1, further comprising a pressure pump for pressuring wash fluid in the wash fluid source, the pressure pump disposed downstream the wash fluid source.

3. The system of claim 2, wherein the pressure pump is operatively coupled to the controller, such that the pressure pump is controlled by the controller via a signal.

4. The system of claim 1, further comprising a flow meter disposed downstream the wash fluid source, the flow meter adapted to measure the quantity of wash fluid being injected into the annulus of the well casing.

5. The system of claim 4, wherein the flow meter is in communication with the controller to provide a signal indicative of the measured quantity of the wash fluid being injected to the controller.

6. The system of claim 1, further comprising a speed varying device coupled to a motor and adapted to control the motor via one or more of an electrical cable or a hydraulic line.

7. The system of claim 6, wherein the speed varying device is operatively coupled to the controller, and the controller manages the speed of the speed varying device via a signal.

8. A progressing cavity (PC) pump system comprising:
   a well casing with an annulus;
   a progressing cavity (PC) pump disposed within the well casing;
   a motor operatively coupled to the PC pump;
   a controller operatively coupled to the motor;
   a gas flow valve in communication with the annulus of the well casing and disposed in a fluid flow line; and
   an automated wash system operatively coupled to the controller, the automated wash system including:
      a wash fluid source; and
      a wash valve in fluid communication with the wash fluid source and the annulus of the well casing, the wash valve adapted to control the flow of wash fluid between the wash fluid source and the annulus and operably coupled to the controller;
      a level sensor disposed in the wash fluid source communicatively coupled to the controller, the controller configured to calculate from the level sensor a wash fluid volume injected into the annulus;
      wherein, upon receipt of a command to initiate a wash cycle, the controller closes the gas flow valve to stop an upward flow of fluid in the annulus of the well casing, opens the wash valve to allow fluid from the wash fluid source to be directed into the annulus, and increases a speed of the PC pump until the calculated wash fluid volume has reached a predetermined target wash volume.

9. The system of claim 8, wherein the PC pump is in fluid communication with the fluid flow line.

10. The system of claim 8, further comprising a casing valve in the fluid flow line.

11. The system of claim 8, further comprising tubing coupled to the PC pump and disposed within the annulus, and a flow tee, wherein fluid from the PC pump travels through the tubing and out of the flow tee.

12. The system of claim 11, further comprising a tubing flow meter disposed downstream the flow tee, the tubing flow meter to measure fluid leaving the flow tee and traveling through the flow line.

13. The system of claim 8, the automated wash system further comprising a pressure pump for pressuring supply fluid in the wash fluid source, the pressure pump disposed downstream the wash fluid source.

14. The system of claim 13, wherein the pressure pump is operatively coupled to the controller, such that the pressure pump is controlled by the controller.

15. The system of claim 8 the automated wash system further comprising a flow meter disposed downstream the wash fluid source, the flow meter adapted to measure the quantity of wash fluid being injected into the annulus of the well casing.

16. The system of claim 15, wherein the flow meter is operably coupled to the controller to provide a signal indicative of the measured quantity of the wash fluid being injected to the controller.

17. The system of claim 8, the automated wash system further comprising a speed varying device coupled to the motor and adapted to control the motor via one or more of an electrical cable or a hydraulic line.

18. The system of claim 17, wherein the speed varying device is operatively coupled to the controller, and the controller manages the speed of the speed varying device.

\* \* \* \* \*

UNITED STATES PATENT AND TRADEMARK OFFICE
CERTIFICATE OF CORRECTION

PATENT NO. : 10,689,963 B2
APPLICATION NO. : 15/711484
DATED : June 23, 2020
INVENTOR(S) : Thomas Matthew Mills It is certified that error appears in the above-identified patent and that said Letters Patent is hereby corrected as shown below:

On the Title Page

At item (54), Line 1, "SYSTEMS" should be -- SYSTEM --.

In the Specification

At Column 1, Line 1, "SYSTEMS" should be -- SYSTEM --.

At Column 4, Line 42-43, "adapted measure" should be -- adapted to measure --.

At Column 6, Line 58, "processing cavity" should be -- progressing cavity --.

At Column 6, Line 67, "PC pump 24" should be -- PC pump 26 --.

At Column 7, Lines 1-2, "Electrical Submersible Processing Cavity Pump (ESPSP)," should be
-- Electrical Submersible Progressing Cavity Pump (ESPCP)," --.

At Column 9, Line 33, "may be trigged" should be -- may be triggered --.

At Column 10, Line 30, "wall casing 22," should be -- well casing 22, --.

In the Claims

At Column 15, Line 51, delete "and" and insert the same at Line 53 after casing.

At Column 15, Line 62, "a the PC pimp" should be -- the PC pump --.

At Column 16, Line 31, delete "and" and insert the same at Line 36 after controller.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*